(12) United States Patent
Wiegand (10) Patent No.: US 6,510,272 B1
(45) Date of Patent: Jan. 21, 2003

(54) TEMPERATURE COMPENSATED FIBER BRAGG GRATING

(75) Inventor: Gordon Wiegand, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 105 days.

(21) Appl. No.: 09/649,494

(22) Filed: Aug. 28, 2000

(51) Int. Cl.[7] ................................................ G02B 6/00
(52) U.S. Cl. ....................................... 385/136; 385/37
(58) Field of Search .................... 385/136, 37

(56) References Cited

U.S. PATENT DOCUMENTS

| | | | |
|---|---|---|---|
| 5,042,898 A | 8/1991 | Moreye t al. | 385/37 |
| 5,682,445 A | 10/1997 | Smith | 385/7 |
| 5,841,920 A | 11/1998 | Lemaire et al. | 385/37 |
| 5,991,483 A | 11/1999 | Engelberth | 385/37 |
| 5,999,671 A | 12/1999 | Jin et al. | 385/37 |
| 6,044,189 A | 3/2000 | Miller | 385/37 |
| 6,101,301 A | 8/2000 | Engelberth et al. | 385/37 |
| 6,181,851 B1 * | 1/2001 | Pan et al. | 385/15 |
| 6,327,405 B1 * | 12/2001 | Leyva et al. | 385/12 |
| 6,393,181 B1 * | 5/2002 | Bulman et al. | 385/123 |
| 6,400,884 B1 * | 6/2002 | Matano et al. | 385/137 |

FOREIGN PATENT DOCUMENTS

| | | | | |
|---|---|---|---|---|
| DE | D3 197 24 528 | 12/1998 | | G02B/6/34 |
| JP | 9211348 | 2/1996 | | G02B/26/08 |
| JP | 01350035 A | * | 12/2001 | |
| JP | 02062433 A | * | 2/2002 | |
| WO | WO 98/59267 | 12/1998 | | G02B/5/18 |
| WO | 0 989 437 | 3/2000 | | G02F/1/01 |

* cited by examiner

*Primary Examiner*—Tulsidas Patel
*Assistant Examiner*—Brian S. Webb
(74) *Attorney, Agent, or Firm*—Alan Ball

(57) ABSTRACT

An assembly and method for a fiber grating package comprising a rod having a first end and a second end and a coefficient of thermal expansion. A first end cap includes a first base having a first opening formed therein to receive the rod for movement of the first end cap along the rod to a first position adjacent to the first end of the rod. The first end cap further includes a first cantilever member extending from the first base and the first cantilever member has a first contact point thereon. A second end cap includes a second base having a second opening formed therein to receive said rod for movement of said second end cap along said rod to a second position adjacent to the second end of the rod. The second end cap further includes a second cantilever member extending from the second base and the second cantilever member has a second contact point thereon. The first end cap and the second end cap have a common rate of thermal expansion that is greater than the coefficient of thermal expansion of the rod. A portion of an optical fiber includes a Bragg grating, the portion of the optical fiber being attached between the first contact point and the second contact point. The portion of an optical fiber has a length defined by the distance between the first and second contact points, such that the length of the portion remains substantially unchanged in an operating range of temperature when the first end cap occupies the first position and the second end cap occupies the second position.

21 Claims, 5 Drawing Sheets

TEMPERATURE COMPENSATED FIBER BRAGG GRATING

BACKGROUND OF THE INVENTION

1. Field of the Invention

The present invention relates to a package for an optical fiber Bragg grating that facilitates accurate fiber adjustment and temperature compensation at selected frequencies. More particularly, the invention provides a packaged Bragg grating of compact size, using passive compensation for consistent wavelength response over a range of temperatures.

2. Discussion of the Related Art

Fiber Bragg gratings may be fabricated with precisely controlled transmission and reflection characteristics that are optically stable over long periods of time. A fiber Bragg grating normally comprises a repeating pattern written into a photosensitive optical fiber using a UV light source or the like. Signals associated with the modulating repeating pattern will vary in response to changes of strain and temperature that affect the physical condition of the inherently highly sensitive grating structure.

Thermal variability of fiber Bragg gratings has been one factor limiting their use in commercial applications. Telecommunications systems, for example, typically operate between temperatures extremes of about −5° C. to about 70° C. The use of passive temperature compensation provides fiber Bragg gratings having consistent response over such a temperature range. Reduction of thermal variability led to more reliable devices for commercial use in e.g. high speed optically amplified transmission networks for the telecommunications industry.

One method for passive temperature compensation of fiber Bragg gratings requires the production of a grating package with a negative coefficient of thermal expansion (CTE). This is usually accomplished by clamping, under tension, the fiber containing the fiber Bragg grating into a mechanical structure made of materials having different, but usually positive, coefficients of thermal expansion. A low-expansion material, such as a ceramic, combined with a high expansion material, such as a metal, yields a package having a coefficient of thermal expansion determined by material selection and device dimensions. This method of passive temperature compensation is well known as a means for improving wavelength stability of fiber Bragg gratings. At least two variations of the method have been investigated. In one approach, materials differing in thermal expansion provide a package that varies the length of an optical fiber. The structure is arranged such that different rates of expansion between the fiber-supporting, structural members cause negative elongation of the fiber with increasing temperature. Typically the fiber is stretched at low temperature and relaxes as the temperature increases, thereby changing the stress applied to the fiber under tension. U.S. Pat. No. U.S. 5,042,898 discloses an apparatus for temperature compensation of a fiber Bragg grating comprising two juxtaposed compensating members with the required differences in thermal expansion. Attachment of the fiber to points on each of the members, places the grating between the two attachment points. The apparatus can be designed to apply tensile or compressive stress to the grating. Other references addressing temperature compensation of fiber Bragg gratings using fiber length variation include U.S. Pat. No. 5,991,483; U.S. Pat. No. 6,101,301 and International Published Application WO 98/59267. Japanese publication JP 9211348 describes the use of a piezoelectric transducer to modulate the strain in a fiber in response to electrical signals. Such devices are effective but costly.

A second variation of passive temperature compensation using materials of dissimilar thermal expansion causes changes in the bend radius of packaged fiber Bragg gratings. This produces tensile stresses in the region of the grating to counterbalance and compensate for wavelength variations resulting from changes in the grating temperature, as described in U.S. Pat. No. 5,841,920 and U.S. Pat. No. 6,044,189.

Temperature compensated fiber Bragg grating packages, as previously discussed, are typically large, exhibiting variation of reflection wavelength from one package to another. In some cases, the design of temperature compensating structures is complex requiring multiple points of connection to form a package having a negative coefficient of thermal expansion. Some packages include fine adjustment of the grating wavelength but this may involve complicated procedures such as the extension or compression of the total package as described in WO 98/59267.

Accordingly, there is need for a small, simple and inexpensive device to provide passive temperature compensation and precise control of fiber Bragg grating characteristics using active strain adjustment to set the desired initial wavelength of a grating during manufacture.

SUMMARY OF THE INVENTION

The present invention provides an improved, compact temperature compensated fiber Bragg grating package and a method for its manufacture including fine tuning the center wavelength of a fiber grating either during or after manufacture of the package.

A temperature compensated fiber Bragg grating package, according to the present invention, includes a fiber support comprising a first member having a first coefficient of thermal expansion and two second members, one each attached adjacent to the ends of the first member. The second members have a second coefficient of thermal expansion that is relatively more than the first coefficient of thermal expansion. The grating package further includes an optical fiber attached to a fiber support between the two second members. A fiber Bragg grating, formed in the optical fiber, may be tuned to a selected wavelength and be provided with temperature compensation means for compensating for any fluctuations in temperature of the package. This is accomplished by adjusting both the length of optical fiber between the second members and the relative positioning of the second members adjacent to the ends of the first member. A compact fiber Bragg grating package, according to the present invention, has a length less than 16 cm. In more compact devices packages having a length less than 10 cm may be selected.

Fiber Bragg gratings, according to the present invention meet requirements for use in an operating temperature range of from about 0° C. to about 60° C., preferably form about −5° C. to about 70° C. This range could be further refined to about −20° C. to about 80° C. Design requirements also typically require storage temperatures in the range from about −45° C. to about 85° C.

More particularly the present invention provides a fiber grating package comprising a rod having a first end and a second end and a coefficient of thermal expansion. A first end cap includes a first base having a first opening formed therein to receive the rod for movement of the first end cap along the rod to a first position adjacent to the first end of the rod. The first end cap further includes a first cantilever member extending from the first base and the first cantilever member has a first contact point thereon. A second end cap includes a second base having a second opening formed therein to receive said rod for movement of said second end cap along said rod to a second position adjacent to the second end of the rod. The second end cap further includes a second cantilever member extending from the second base and the second cantilever member has a second contact point thereon. The first end cap and the second end cap have a common rate of thermal expansion that is greater than the coefficient of thermal expansion of the rod A portion of an optical fiber includes a Bragg grating, the portion of the optical fiber being attached between the first contact point and the second contact point. The portion of an optical fiber has a length defined by the distance between the first and second contact points, such that the length of the portion remains substantially unchanged in an operating range of temperature when the first end cap occupies the first position and the second end cap occupies the second position.

The present invention includes a method for assembling and then tuning a temperature compensated fiber grating package. The method includes providing a rod having a first end and a second end and a coefficient of thermal expansion and mounting a first end cap including a first base at a first position adjacent to the first end of the rod. The first end cap further includes a first cantilever member extending from the first base and the first cantilever member has a first contact point thereon. A second end cap including a base is then mounted at a second position adjacent to the second end of the rod. The second end cap further includes a second cantilever member extending from the second base and the second cantilever member has a second contact point thereon. The first end cap and the second end cap have a common rate of thermal expansion that is greater than the coefficient of thermal expansion of the rod. A portion of an optical fiber including a Bragg grating is attached between the first contact point and the second contact point. The portion has a length defined substantially by the distance between the first and second contact points. Thereafter a torsional force is applied to at least one of the cantilever members to increase the distance between the at least one cantilever member and the rod to tune the Bragg grating to a selected wavelength.

The present invention further provides a method for assembling a wavelength tuned, temperature compensated fiber grating package, comprising providing a rod having a first end and a second end and a coefficient of thermal expansion and mounting a first end cap including a first base at a first position adjacent to the first end of the rod. The first end cap further includes a first cantilever member extending from the base and the first cantilever member has a first contact point thereon. The first end is secured at the first position before mounting a split end cap including a base member adjacent to the second end of the rod. The split end cap further includes a cantilever member extending from the base member of the split end cap and detachable therefrom. The cantilever member of the split end cap has a second contact point thereon. The first end cap and the split end cap have a common rate of thermal expansion that is greater than the coefficient of thermal expansion of the rod. A portion of an optical fiber including a Bragg grating is attached between the first contact point and the second contact point. The portion of an optical fiber is tuned to a selected wavelength corresponding to a length defined by the distance between the first and second contact points. While maintaining the defined length, the base member is detached from the cantilever member and moved to a position separated from the first position such that the length of the portion of an optical fiber remains substantially unchanged in an operating range of temperature. Thereafter the base member is securely bonded to the rod and the cantilever member is securely bonded to the base member of the split end cap to produce the wavelength tuned, temperature compensated fiber grating package.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

In its preferred embodiment the present invention provides an apparatus for active wavelength tuning during assembly of a fiber Bragg grating package. The process includes securing the fiber to a fiber support and thereafter adjusting the fiber support to precisely tune the grating to a desired wavelength.

Figure 1:
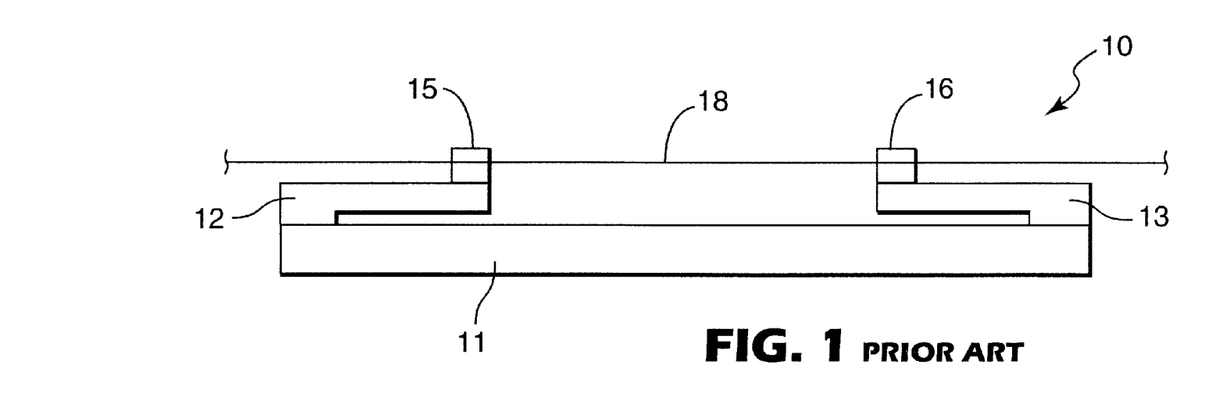
FIG. 1 illustrates a temperature compensation package as shown in the prior art.
Figure 2:
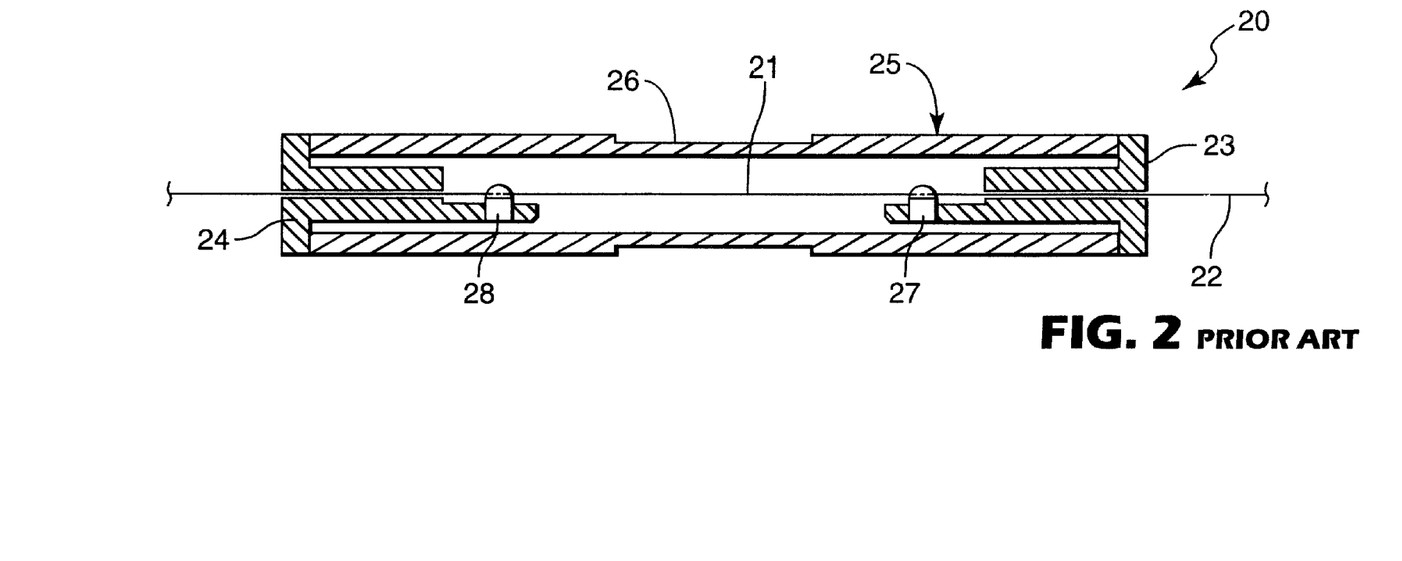
FIG. 2 illustrates schematically the structure of a prior art temperature compensation structure adapted for package length alteration to substantially fix the center frequency of the grating.

Referring now to the Figures wherein like numerals refer to like parts throughout the several views, FIG. 1 and FIG. 2 show prior art temperature compensated fiber Bragg grating devices. FIG. 1 illustrates an arrangement 10, known to those skilled in the art, which includes a temperature-compensating package using a conventional combination of materials with differing thermal expansions. A first material 11, typically in the form of an elongate rectangular block, expands with temperature at a rate that is relatively low compared to a second material used for end portions 12, 13 that are secured to the ends of the elongate rectangular block 11. The combined expansions of the two forms of material 11, 12 and 13 produces a substantially stable separation between points of attachment 15, 16 of an optical fiber 18 to the end portions 12, 13, thereby maintaining the overall strain on the fiber 18 in the intermediate region so as to counteract temperature induced wavelength shifts.

FIG. 2 illustrates an alternative embodiment of a prior art fiber Bragg grating package that includes temperature compensation. This embodiment 20 maintains a previously written grating 21 on a fiber 22 in a condition to allow adjustment of the grating frequency. The package 20 includes two end portions 23, 24 made of a first material, such as stainless steel, having a high coefficient of thermal expansion. An optical fiber 22 stretches between two points of attachment 27, 28, there being one point on each of the end portions 23, 24. A tubular member 25 has a lower coefficient of thermal expansion than the first material and includes a thinned section 26. This section 26 yields under stress for wavelength tuning after full assembly of the temperature compensated package 20.

After attaching the fiber 22, the package 20 can be extended or shortened in an axial direction. These changes require the application of a controlled force to the thinned section 26 of the tubular member 25 to adjust and permanently change the length of the package 20 and the strain on the fiber Bragg grating 21. The adjustment after assembly substantially permanently sets the wavelength response of the device.

It will be noted from the previous discussion that prior art embodiments include permanent secure bond formation between materials of lower coefficient of thermal expansion and associated end portions that expand more rapidly. There is not evidence to show that the package illustrated in FIG. 1 is tunable to a substantially precise wavelength. Post tuning for an assembled grating package of prior art FIG. 2 increases the force on the total package rather than concentrating the strain in the optical fiber where it is primarily needed.

Figure 3:
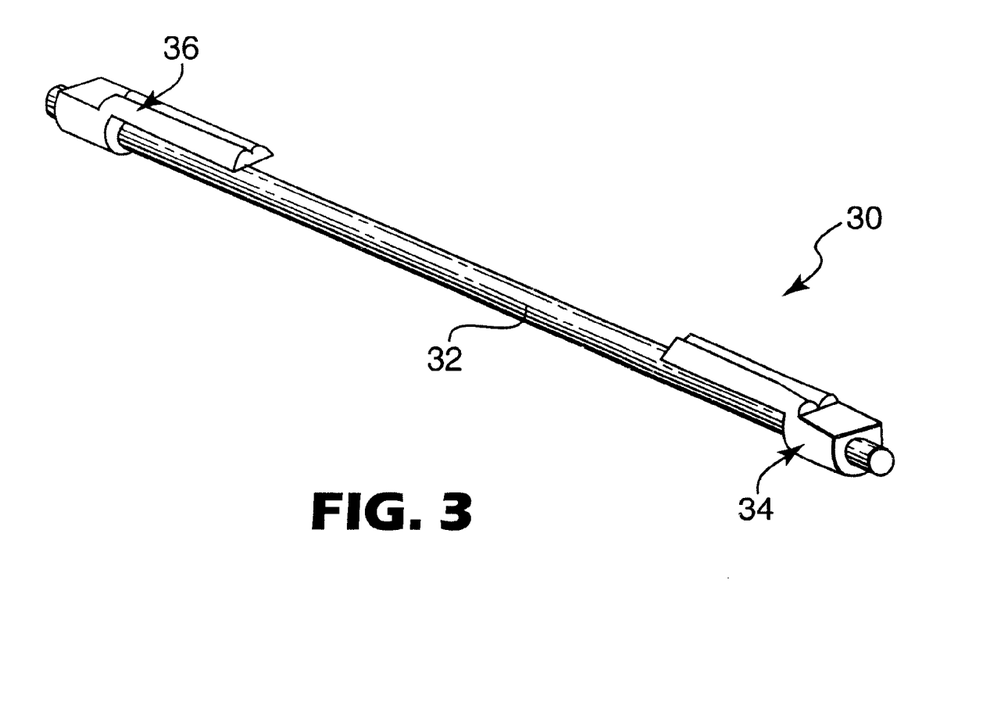
FIG. 3 is a perspective view of a support structure, according to the present invention, for an optical fiber that includes a Bragg grating.

In contrast, the present invention, in its several embodiments, provides a compact fiber Bragg grating package that may be substantially precisely tuned to a desired wavelength using spectrograph monitored, active adjustment during assembly of the device. With reference to FIG. 3, a distinguishing feature of the present invention is the use of end portions, also referred to herein as a first end cap 34, and a second end cap 36, adapted for movable positioning on the surface of a cylindrical rod 32 of a material which has a coefficient of thermal expansion less than the end caps 34, 36. Preferably the rod 32 has a thermal expansion coefficient below 1.0 ppm/° C. preferably 0.4 ppm/° C. and the material used for the end caps 34, 36 has a rate of thermal expansion less than about 40 ppm/° C. preferably of about 23 ppm/° C. The end caps typically comprise a metallic material, preferably aluminum and alloys of aluminum. A fiber support 30 for an optical fiber (not shown) includes a cylindrical ceramic rod 32, preferably a quartz rod, that allows the first end cap 34, and the second end cap 36 to slide along its length to selected positions at which securing means hold them firmly mounted at opposing ends of the rod 32. The length of a fiber support 30 is about 10 cm. or less which is also the length of the rod 32.

Figure 4:
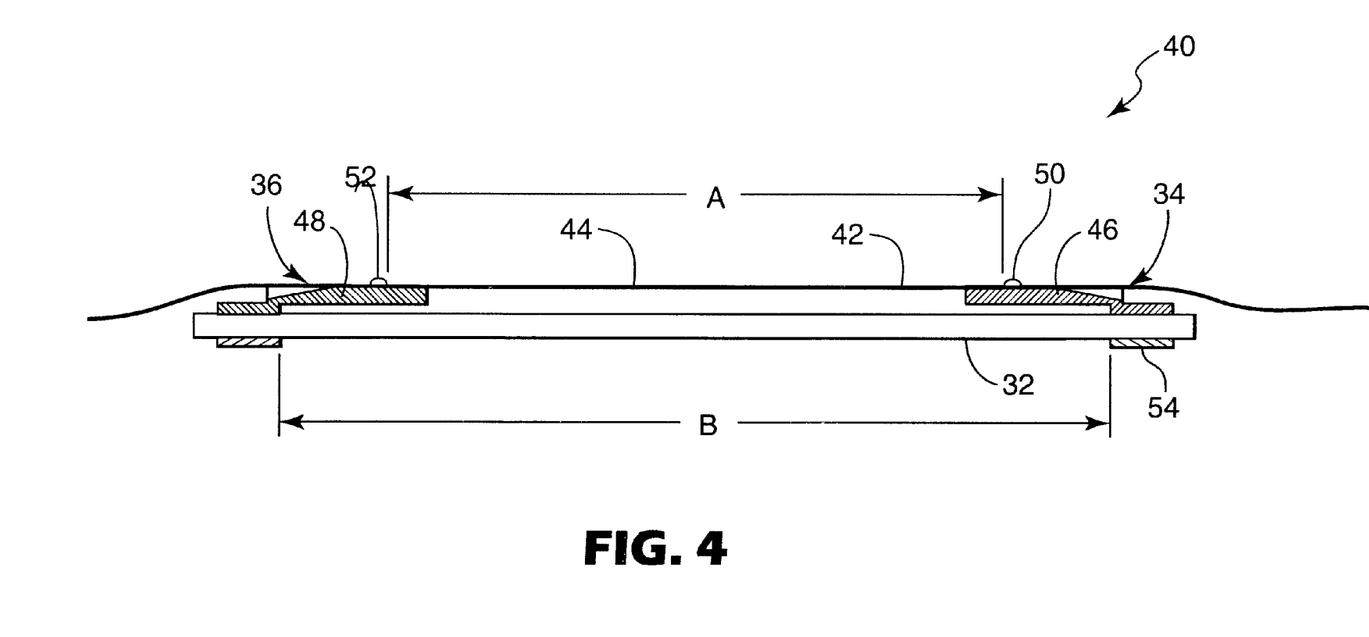
FIG. 4 is a cross section of a side elevation of a fiber Bragg grating package according to the present invention.

FIG. 4 shows a cross sectional view of a side elevation of an assembled fiber grating package 40 according to the present invention. The package 40 includes the fiber support 30 and an optical fiber 42 having a Bragg grating 44 positioned between the ends of a first cantilever 46, forming part of the first end cap 34, and a second cantilever 48 that is a part of the second end cap 36. For the majority of fiber grating packages 40, the fiber 42 is held under strain. Intentional introduction of this strain occurs during firm attachment of the fiber 42 to first and second contact points 50, 52 on the cantilevers 46, 48. A number of available means for firmly attaching the fiber 42 to the cantilevers 46, 48 includes mechanical bonding or bonding using epoxy adhesives, low melting glasses, metal solders and the like. Processes for optical fiber attachment may include heat that can alter the wavelength of the grating 44. Also, the means for bonding a fiber 42 to contact points 50, 52 on either of the cantilevers 46, 48 may introduce shrinkage. Such shrinkage may occur, particularly during adhesive bonding, as either an epoxy cures or a low melting glass frit sets. Stresses in a curing or setting bonding material could produce changes in the strain on an attached fiber 42 causing alteration of the wavelength setting of an associated Bragg grating 44.

FIG. 4 includes identifying letter A referring to the length of the optical fiber 42 between the contact points 50, 52 and identifying letter B referring to the length of the rod 32 between the end caps 34, 36. Fabrication of a temperature compensated fiber grating package requires determination of a ratio A/B also referred to herein as the package length ratio.

The formula for calculating the package length ratio is as follows:

$$L_{package} = L_{fiber}\left(\frac{\alpha_{effective} - \alpha_{cap}}{\alpha_{rod} - \alpha_{cap}}\right)$$

where $L_{fiber}$ is the length of fiber between the contact points, $L_{package}$ is the length of rod between the end caps, and $\alpha_i$ is the coefficient of thermal expansion (CTE) for component i in the package. For a quartz rod and aluminum caps the CTE's are $\alpha_{rod}$=0.4 and $\alpha_{cap}$=23 $\mu$m/m/° C. The effective fiber CTE that the package needs to impose on the fiber for proper compensation –9.3 $\mu$m/m/° C. Substituting these values into the above equation we get:

$$L_{package} = L_{fiber}\left(\frac{-9.3 - 23}{0.4 - 23}\right) = (1.43)L_{fiber}$$

Use of this equation assumes that there is no mechanical compliance in the package such as rod bending or adhesive shearing. In practice compliance does exist. Finite element calculations indicate deviations of the length ratio can become as low as 1.3 in some extreme cases. Sometimes that number can go higher to about 1.6.

The –9.3 $\mu$m/m/° C. effective CTE comes from the following equation which is simply a rearranged form of the equation in the UT patent (U.S. Pat. No. 5,042,898 line 65):

$$\alpha_{effective} = \frac{1}{(1-P_e)}\left(\frac{1}{n} \cdot \frac{\partial n}{\partial T} + \alpha_{fiber}\right)$$

where $P_e$ (=0.22) is the strain-optic coefficient for the fiber, $\alpha_{fiber}$ (=0.55 $\mu$m/m/° C.) is the axial CTE of the unstressed fiber and $$\frac{1}{n} \cdot \frac{\partial n}{\partial T} = 6.7 \text{ ppm/°C.}$$

where n is the average refractive index of the fiber and T is temperature.

Figure 5:
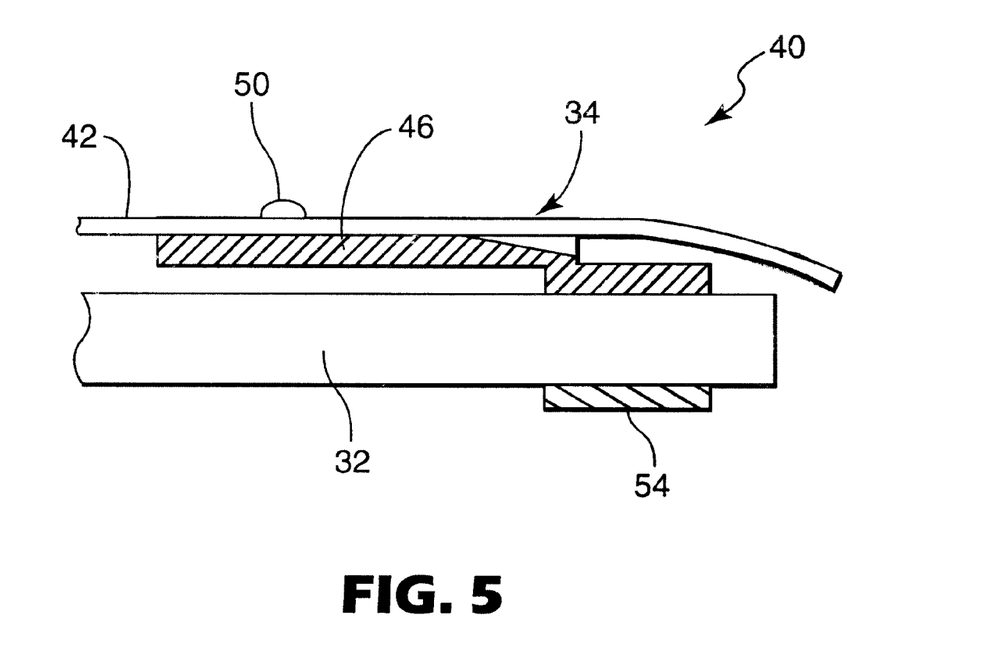
FIG. 5 is a cross section of a portion of a fiber Bragg grating package according to the present invention showing a point of attachment of a fiber to an end cap that is connected to a ceramic rod.

FIG. 5 provides a partial cross sectional view of a portion of a fiber grating package 40 according to the present invention indicating how the base 54 of an end cap 34, 36 may be mounted for movement along a rod 32. The end cap base 54 needs to be secured to the rod 32 after it has been moved to a selected position, usually before attaching a fiber-under-tension 42 to the contact point 50 on the cantilever 46. Bonding means, including mechanical bonding or bonding using adhesives, low melting glasses, and metal solders, as previously discussed, may also be used for this purpose.

The present invention includes a method for assembling a fiber support 30 and firmly attaching an optical fiber 42 to the fiber support 30, before applying longitudinal stress to the optical fiber 42 to "tune" the wavelength of the Bragg grating 44 included in the resulting fiber Bragg grating package 40. A preferred method comprises a series of steps including providing a fiber support 30 including end caps 34, 36 having cantilevers 46, 48 with contact points 50, 52 to which a fiber 42 under tension may be firmly attached. During initial attachment of the fiber 42 the wavelength setting is not critical but preferably is lower than that desired of the final package 40.

After attaching the fiber 42 to the contact points 50, 52 on the cantilevers 46, 48 and allowing for shrinkage related to the means for bonding attachment, the base 54 of each end cap 34, 36 is mounted securely on the rod 32 to maintain the existing state of tension in the optical fiber 42. Placement of the end caps 34, 36 on the rod 32 requires careful positioning according to the ratio of A to B as previously discussed. This provides a fiber grating package 40 having the desired characteristics of temperature compensation.

Secure mounting of the end caps 34, 36 to the rod 32 and firm attachment of the optical fiber 42 between the contact points 50, 52, preferably uses an epoxy adhesive. After completing bonding connection among the parts 32, 34, 36, 42, 50, 52, of the fiber grating package 40, adjustment and tuning of the wavelength of the Bragg grating 44 requires application of torsional force to the cantilevers 46, 48. During this process, the ends of the cantilevers 46, 48 are bent away from the surface of the rod 32 using an appropriate fixture. This increases the distance between the cantilevers 46, 48, and the distance separating the optical fiber 42 from the rod 32. The increase in distance between the cantilevers 46, 48 raises the tension in the optical fiber 42 and adds to its length causing a change in the wavelength setting of the Bragg grating 44. The range of increase in length required to provide a full range of tuning for most applications is typically less than 5 $\mu$m. The post tuning operation is preferably carried out at the temperature of operation of the device thereby providing a resulting fiber grating package which provides an accurate wavelength at any given temperature across an operating temperature range.

The present invention may also include a method for pre-mounting and securing the first end cap 34 and the second end cap 36 to the rod 32 to provide a temperature compensated fiber support 30. An advantage of this method is the pre-assembly of multiple fiber supports 30 using fixtures to accurately position end caps 34, 36 on rods 32. Pre-assembled parts 30 may be stored for future use. After firmly attaching an optical fiber 42 to a pre-assembled, temperature compensating fiber support 30, torsional adjustment of tension in the optical fiber "tunes" the wavelength of the Bragg grating included in the resulting fiber Bragg grating package 40. Adjustment of tension in the fiber 42 requires the use of a fixture that applies a force to one or both cantilevers 46, 48 changing the separation and increasing the angle between a cantilever 46 and the rod 32.

Figure 6:
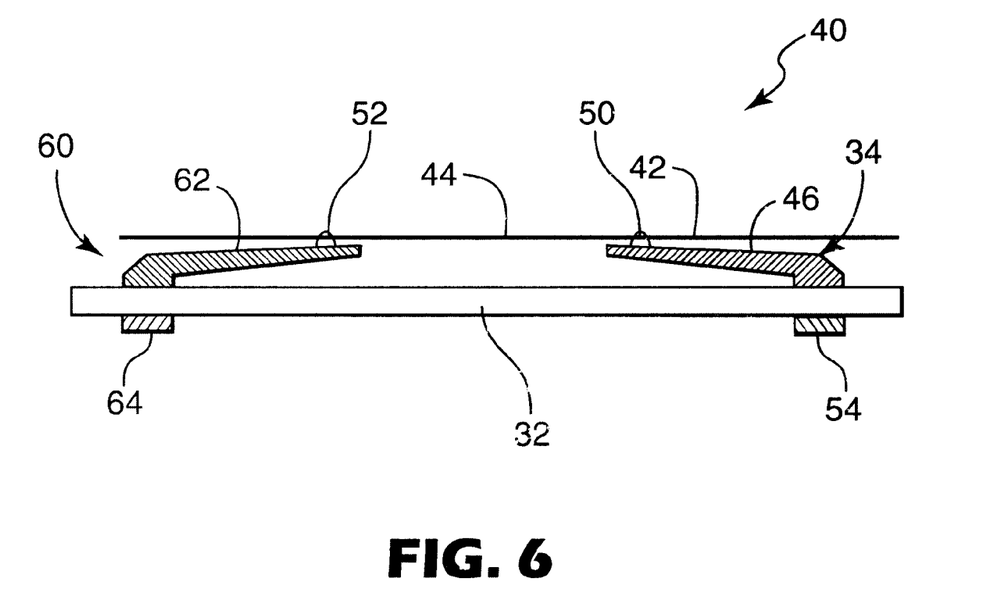
FIG. 6 shows a cross section of a side elevation of a fiber Bragg grating package including a split end cap for active adjustment of the wavelength of a grating.

FIG. 6 is a similar cross section to FIG. 4 showing, in this case, a split end cap 60. The split end cap 60 comprises a cantilever member 62 that is initially separate from the base member 64 of the split end cap 60. The split cap design facilitates both steps of wavelength adjustment and temperature compensation during the process of manufacturing for individual fiber grating packages 40.

A method for assembly of a fiber grating package 40 using a split end cap 60 comprises steps beginning with secure mounting of the first end cap 34 adjacent to one end of the rod 32. The other end of the rod 32 has a base member 64 of a split end cap 60 mounted to slide over the surface of the rod 32. After determining the required separation of the first end cap 34 from the split end cap 60, the cantilever member 62 is detachably joined to the base member 64. This provides an adjustable split end cap 60 that is held in a fixed position during firm attachment of an optical fiber 42 at contact points 50, 52 on the first cantilever 46 and the cantilever member 62. The fixed positioning of the split end cap 60 maintains separation between end caps 34, 60 as well as inducing desired strain in the optical fiber 42. The distance between the contact points 50, 52 provides the length dimension required for calculating the fiber grating package compensation ratio and the distance required between the end cap base 54 and the base member 64. After comparing the required position of the base member 64 with its existing condition it may be necessary to move the base member 64 to the preferred location on the rod 32. Adjusting the position of the base member 64 includes first detaching it from the cantilever member 62 which maintains its position during the adjustment so that the length of the fiber between the contact points 50, 52 does not change. After sliding the base member 64 to its preferred position on the rod 32, bonding means may be applied to secure the parts 62, 64 of the split end cap 60 to each other and to rigidly mount the base member to the rod 32. Optionally, the wavelength of a fiber Bragg grating 44 could be finally adjusted following firm attachment of an optical fiber between the first end cap 34 and the split end cap 60. Preferably such an adjustment of wavelength would be an active adjustment of the cantilever member 62 while observing wavelength variation using a spectrograph. The clear separation of wavelength tuning from grating package temperature compensation provides the opportunity for increased precision at each of these steps in the process of fiber grating package assembly.

Figure 7:
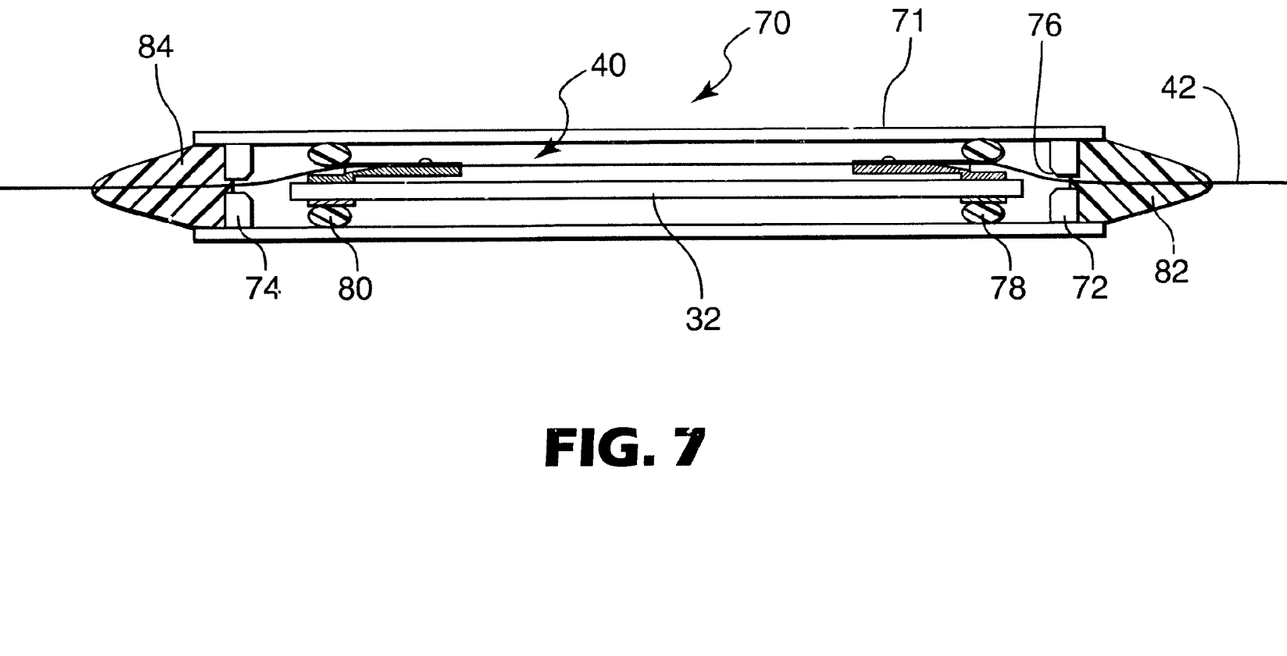
FIG. 7 is a cross section of a side elevation showing a fiber Bragg grating package sealed inside a protective housing.

FIG. 7 provides a cross sectional view of a fiber Bragg grating package 40 sealed inside a protective housing 70. Typically, a Bragg grating package 40 would be supplied in such a protective housing 70 to be used in e.g. a telecommunications network. The housing 70 comprises a cylindrical tube 71, preferably fabricated from stainless steel. Metal plugs 72, 74 each include orifices having chamfered edges 76. The orifices provide guide channels where the optical fiber 42 exits from the ends of the tube 71. The plugs 72, 74 also prevent access to the grating package by contaminants. A first elastomer bead 78 and a second elastomer bead 80 fill space between the ends of the grating package 40 and the inside surface of the cylindrical tube 71. The elastomer beads 78, 80 provide support and vibration dampening for the grating package while, at the same time, sealing the central portion of the package 40 against attack by moisture and other environmental contaminants. A first end seal 82 and a second end seal 84, comprising an elastomer material, provide additional barriers to entry of contaminants into the protective housing while providing strain relief for the optical fiber. Preferably a silicone elastomer is used for both the elastomer beads 78, 80 and the end seals 82, 84.

While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A fiber grating package comprising:
   a cylindrical rod having a first end and a second end and a coefficient of thermal expansion;
   a first end cap including a first base having a first opening formed therein to receive said cylindrical rod for movement of said first end cap along said cylindrical rod to a first position adjacent to said first end, said first end cap further including a first cantilever member extending from said first base said first cantilever member having a first contact point thereon;
   a second end cap including a second base having a second opening formed therein to receive said cylindrical rod for movement of said second end cap along said cylindrical rod to a second position adjacent said second end, said second end cap further including a second cantilever member extending from said second base of said second end cap, said second cantilever member having a second contact point thereon, said first end cap and said second end cap having a common rate of thermal expansion that is greater than the coefficient of thermal expansion of said rod; and
   a portion of an optical fiber including a Bragg grating, said portion attached between said first contact point and said second contact point, said portion having a length defined substantially by the distance between said first and second contact points, said length remaining substantially unchanged in an operating range of temperature, when said first end cap occupies said first position and said second end cap occupies said second position, said first cantilever member and said second cantilever member adapted for adjustment to tune the wavelength of said Bragg grating after attaching said portion of said optical fiber between said first and second contact points.

2. The fiber grating package as claimed in claim 1 wherein said cylindrical rod has a length less than 16 cm.

3. The fiber grating package as claimed in claim 1 wherein said cylindrical rod has a length less than 10 cm.

4. The fiber grating package as claimed in claim 1 wherein said cylindrical rod comprises a ceramic material.

5. The fiber grating package as claimed in claim 4 wherein said ceramic material has a coefficient of thermal expansion of about 0.4 ppm/° C.

6. The fiber grating package as claimed in claim 4 wherein said ceramic material is selected from the group consisting of quartz, silica, and glass.

7. The fiber grating package as claimed in claim 1 wherein said first end cap and said second end cap comprise a metallic material.

8. The fiber grating package as claimed in claim 7 wherein said metallic material has a rate of thermal expansion of about 23 ppm/° C.

9. The fiber grating package as claimed in claim 8 wherein said metallic material is aluminum.

10. The fiber grating package as claimed in claim 1 wherein said operating range of temperature is from about −20° C. to about 80° C.

11. The fiber grating package as claimed in claim 1 wherein said operating range of temperature is from about −5° C. to about 70° C.

12. The fiber grating package as claimed in claim 1 wherein said operating range of temperature is from about 0° C. to about 60° C.

13. A temperature compensated fiber support comprising:
    a rod having a first end and a second end and a coefficient of thermal expansion;
    a first end cap including a first base having a first opening formed therein to receive said cylindrical rod for movement of said first end cap along said cylindrical rod to a first position adjacent to said first end, said first end cap further including a first cantilever member extending from said first base said first cantilever member having a first contact point thereon for attachment of an optical fiber;
    a second end cap including a second base having a second opening formed therein to receive said cylindrical rod for movement of said second end cap along said cylindrical rod to a second position adjacent said second end, said second end cap further including a second cantilever member extending from said second base of said second end cap, said second cantilever member having a second contact point thereon for attachment of said optical fiber, said first end cap and said second end cap having a common rate of thermal expansion that is greater than the coefficient of thermal expansion of said rod, said first cantilever member and said second cantilever member adapted for adjustment of said optical fiber after attachment to said first and second contact points.

14. A temperature compensated fiber support as claimed in claim 13 wherein said rod is an elongate cylinder.

15. A temperature compensated fiber support as claimed in claim 14 wherein said elongate cylinder has a length less than 10 cm.

16. A temperature compensated fiber support as claimed in claim 13 wherein said rod comprises a ceramic material.

17. A temperature compensated fiber support as claimed in claim 16 wherein said ceramic material is selected from the group consisting of quartz, silica, and glass.

18. A temperature compensated fiber support as claimed in claim 13 wherein said first end cap and said second end cap comprise a metallic material.

19. A method for assembling a fiber grating package, comprising the steps of:
    providing a cylindrical rod having a first end and a second end and a coefficient of thermal expansion;
    mounting a first end cap including a first base at a first position adjacent to said first end of said cylindrical rod, said first end cap further including a first cantilever member extending from said first base said first cantilever member having a first contact point thereon;
    mounting a second end cap including a second base at a second position adjacent to said second end of said cylindrical rod, said second end cap further including a second cantilever member extending from said second base of said second end cap, said second cantilever member having a second contact point thereon, said first end cap and said second end cap having a common rate of thermal expansion that is greater than the coefficient of thermal expansion of said rod;
    attaching a portion of an optical fiber including a Bragg grating between said first contact point and said second contact point, said portion having a length defined substantially by the distance between said first and second contact points; and
    applying torsional force to at least one of said cantilever members to increase the distance between said cantilever member and said rod to tune said Bragg grating to a selected wavelength.

20. A method for assembling a fiber grating package, comprising the steps of:
    providing a cylindrical rod having a first end and a second end and a coefficient of thermal expansion;

mounting a first end cap including a first base at a first position adjacent to said first end of said cylindrical rod, said first end cap further including a first cantilever member extending from said base said first cantilever member having a first contact point thereon;

securing said first end cap at said first position;

mounting a split end cap including a base member adjacent said second end of said rod, said split end cap further including a cantilever member extending from said base member of said split end cap and detachable therefrom, said cantilever member having a second contact point thereon, said first end cap and said split end cap having a common rate of thermal expansion that is greater than the coefficient of thermal expansion of said rod;

attaching a portion of an optical fiber including a Bragg grating between said first contact point and said second contact point;

tuning said portion to a selected wavelength corresponding to a length substantially defined by the distance between said first and second contact points;

maintaining said length;

detaching said base member from said cantilever member and separating said base member of said split end cap to a position separated from said first position such that said length of said portion remains substantially unchanged in an operating range of temperature; and securely bonding said base member to said rod and said cantilever member to said base member to produce said wavelength tuned, temperature compensated fiber grating package.

21. A fiber grating package comprising:

a cylindrical rod having a first end and a second end and a coefficient of thermal expansion, a first end cap including a first base having a first opening formed therein to receive said cylindrical rod said first opening being adapted to allow movement of said first end cap along said cylindrical rod to a first position adjacent to said first end, said first end cap further including a first cantilever member extending from said first base said first cantilever member having a first contact point thereon;

a second end cap including a second base having a second opening formed therein to receive said cylindrical rod, said second opening being adapted to allow movement of said second end cap along said cylindrical rod to a second position adjacent said second end, said second end cap further including a second cantilever member extending from said second base, said second cantilever member having a second contact point thereon, said first end cap and said second end cap having a common rate of thermal expansion that is greater than the coefficient of thermal expansion of said rod; and an optical fiber connected to said first and second cantilever members at said first and second contact points respectively wherein the portion of said optical fiber extending between said first and second contact points comprises a Bragg grating and has a length, when said first end cap occupies said first position and said second end cap occupies said second position, said first cantilever member and said second cantilever member adapted for adjustment of said length of said optical fiber to tune the tension in said Bragg grating, said length after adjustment remaining substantially unchanged over temperatures within a range of −5° C. to 70° C.

* * * * *